Figure 1:
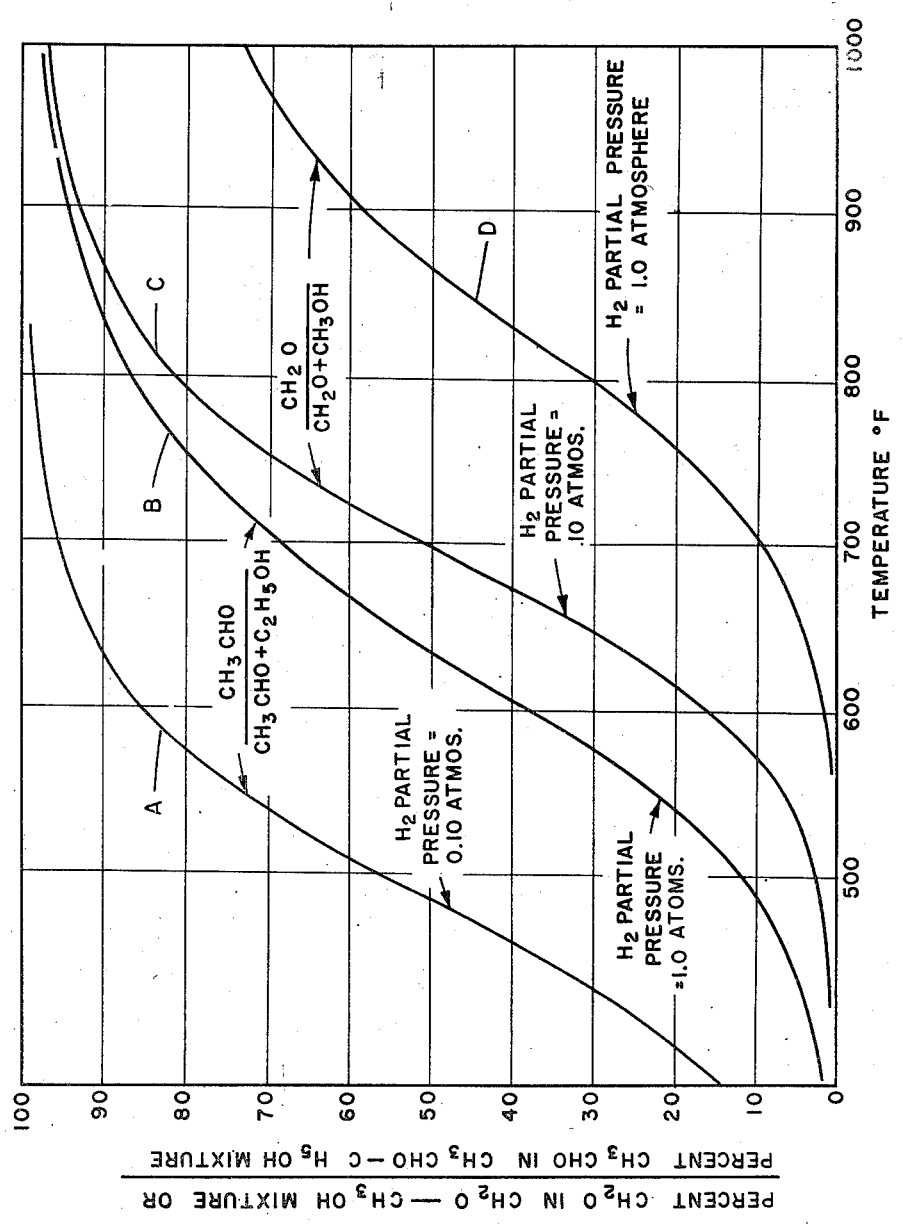

July 30, 1957 W. C. LAKE 2,801,260
PROCESS FOR PARTIAL OXIDATION OF HYDROCARBONS
Filed Dec. 27, 1954 2 Sheets-Sheet 1

INVENTOR.
WILLIAM C. LAKE
BY *Arthur McAley*
ATTORNEY

United States Patent Office 2,801,260
Patented July 30, 1957

2,801,260
PROCESS FOR PARTIAL OXIDATION OF HYDROCARBONS

William C. Lake, Tulsa, Okla., assignor to Pan American Petroleum Corporation, a corporation of Delaware Application December 27, 1954, Serial No. 477,658

7 Claims. (Cl. 260—452)

The present invention relates to a method for conducting the vapor phase partial oxidation of hydrocarbons. More particularly, it is concerned with a procedure whereby the distribution of products resulting from such partial oxidation can be controlled.

In the conventional processes for the vapor phase partial oxidation of hydrocarbons, the product chemicals usually comprise from about 55 to 65 percent aldehydes and ketones, with a major portion of this fraction being aldehydes; 20 to 25 percent alcohols, principally methanol; 4 or 5 percent esters and about 2 percent acids. Generally speaking, such a high proportion of aldehydes and ketones is undesirable because the demand for these classes of chemicals is not nearly as great as it is in the case of alcohols and acids. From the above figures, however, it is indicated that the most desirable classes of chemicals are produced in smaller portions than the products which generally are less in demand. Thus, it will be appreciated that insofar as current partial oxidation procedures are concerned, the latter are relatively inflexible with respect to product class distribution and, hence, may become economically unattractive with changing market conditions.

It is an object of my invention to provide a process for the vapor phase partial oxidation of hydrocarbons whereby the product distribution as to classes can be controlled at will. It is a further object of my invention to furnish a commercially practicable process by which the content of aldehydes, alcohols or acids may be selectively decreased or increased as desired.

Broadly, my invention is based upon the discovery that in the vapor phase partial oxidation of hydrocarbons, the following reactions reach equilibrium under the conditions of the process:

(1) 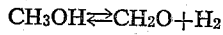
$$CH_3OH \rightleftharpoons CH_2O + H_2$$

(2) 
$$C_2H_5OH \rightleftharpoons CH_3CHO + H_2$$

(3) 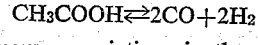
$$CH_3COOH \rightleftharpoons 2CO + 2H_2$$

At constant pressure, variations in the temperature can readily alter the proportion of products in the equilibrium mixture formed by the product gases. Thus, where a reaction is involved similar to that illustrated by Equation 1, formaldehyde can be increased by recycling methanol to the reaction mixture. If it is desired to increase the methanol content of the product, the formaldehyde should be recycled. The equilibrium constant for this reaction increases roughly 100-fold from a temperature of 600° F. to 900° F. Therefore, since higher temperatures favor an equilibrium mixture having an increased ratio of formaldehyde to methanol, control of the temperature at which the exit gas is quenched as it leaves the reactor, under conditions such that the temperature of the quenched gas is about 900° to 950° F., will result in a product having an increased proportion of formaldehyde over product gases quenched at lower temperatures. On the other hand, if the effluent gas is at a lower temperature when the quenching operation is effected, the proportion of methanol is increased and the formaldehyde concentration is correspondingly decreased. Comparable conditions give similar results in the system illustrated by Equation 2.

Equation 3 involving acetic acid may be forced in the direction of acetic acid formation by the addition of hydrogen and carbon monoxide to the total feed, or by recycling hydrogen and carbon monoxide formed as products. Since this reaction is also quite sensitive to temperature from the standpoint of equilibrium, as low temperatures (500° to 600° F.—noncatalytic conditions) as are practical should be used to establish equilibrium favorable to acetic acid formation. This reaction differs somewhat from those represented by the first two equations in that the former is substantially more sensitive to pressure. At a given temperature, addition of hydrogen, alone, to any of the system represented by the above equations results in increased yields of methanol, ethanol and acetic acid.

Effects similar to those pointed out above are obtained with the same systems when operating at a constant temperature but at varying pressure. Thus, with decreasing pressure, the formation of aldehydes in Equations 1 and 2 and the formation of carbon monoxide and hydrogen in Equation 3 is increased, while at higher pressures the tendency to form acid in Equation 3 and alcohols in Equations 1 and 2 increases.

These facts are readily observed by reference to the curves in the accompanying drawings. For example, in Figure 1, the percent formaldehyde in a mixture of methanol and formaldehyde and the percent acetaldehyde in a mixture of ethanol and acetaldehyde are plotted against temperature at various hydrogen partial pressures. Thus, Curve A is a plot representing the change in percent acetaldehyde in an acetaldehyde-ethanol mixture with changing temperature and at a constant hydrogen partial pressure of about 0.1 atmosphere. Under these conditions, it is apparent that as the temperature increases, the ratio of acetaledhyde to ethanol present in an equilibrium mixture increases; whereas, as the temperature decreases, the ratio of aldehyde to alcohol decreases. Also, the effect of hydrogen partial pressure may be seen by comparing Curves A and B. For example, at a given temperature, i. e., 600° F., the ratio of aldehyde to alcohol plus aldehyde is approximately 2.3 times greater at a hydrogen partial pressure of 0.1 atmosphere than at a hydrogen partial pressure of 1.0 atmosphere. Curves C and D illustrate similar effects obtained by varying the hydrogen partial pressure at constant temperature, as well as the effect secured by changing temperature at constant hydrogen partial pressure employing the system formaldehyde-methanol.

Figure 2:
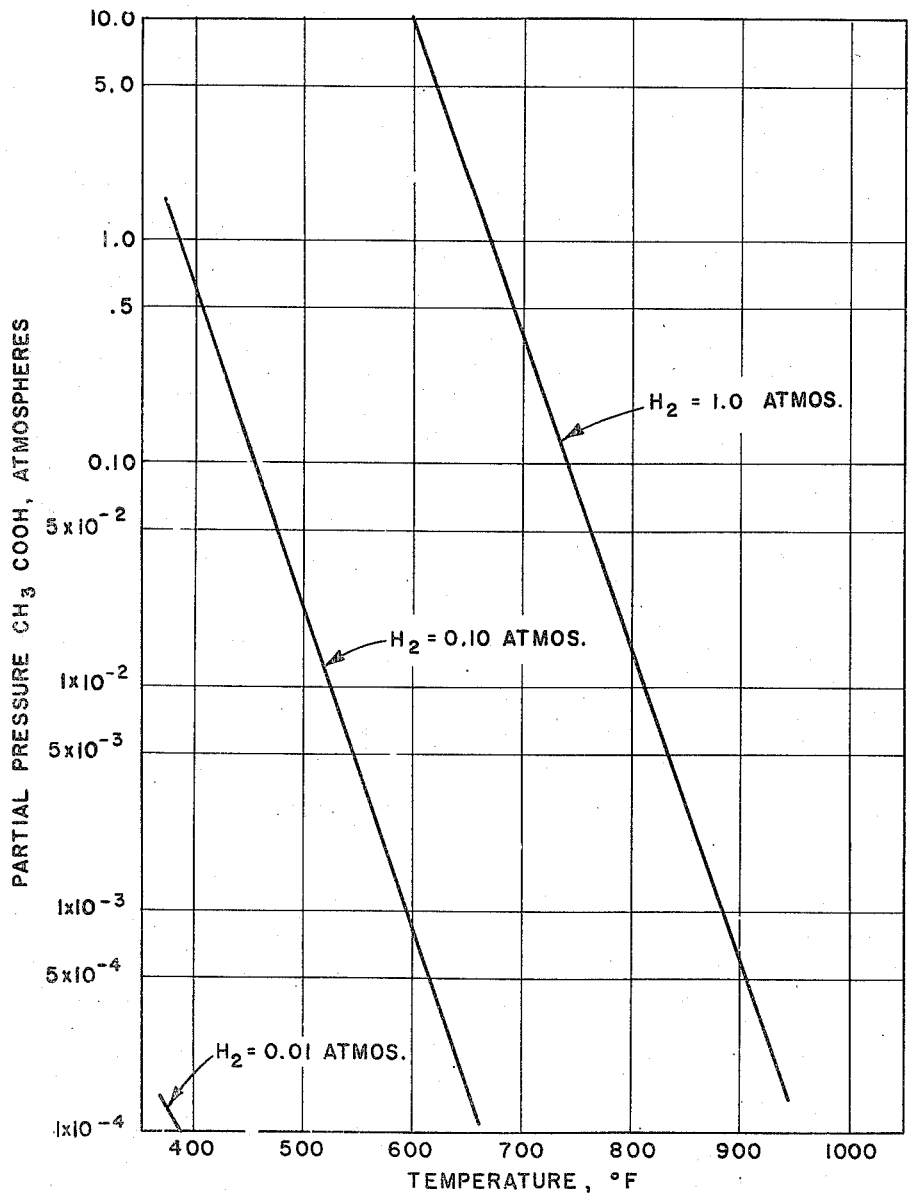

Figure 2 illustrates the effect of both temperature and hydrogen partial pressure on the quantity of acetic acid present in the equilibrium mixtures produced by vapor phase partial oxidation of hydrocarbons. From the plots shown in Figure 2, it will be seen that the same conditions favoring increased proportions of alcohols also favor the formation of additional amounts of acetic acid. Thus, in general, it may be said that the formation of the acid is favored by both decreased temperature and increased partial pressure of hydrogen and/or carbon monoxide. In other words, at a given hydrogen and/or carbon monoxide partial pressure, the quantity of acid present in the equilibrium mixture will vary inversely with the temperature. The data used in preparation of the plots shown in Figure 2 are based on ratios of carbon monoxide to hydrogen of from about 4:1 to about 6:1.

My invention further involves appreciation of the fact that, since the above-noted reactions do reach equilibrium under the partial oxidation conditions employed, the composition of the product gas stream as it leaves the reactor may be regulated by controlling the temperature at which said stream is quenched. By knowing the temperature at which one or more of the above reactions are at equilibrium, the composition of the reaction mixture, with respect to a given product or to a class of products, can be controlled merely by quenching the mixture under conditions such as to give a temperature corresponding to that favoring formation of the class of product or products desired. This, of course, applies whether the reaction is effected under catalytic or non-catalytic conditions.

In carrying out the process of my invention, the partial oxidation may be effected under known conditions. The residence time employed, however, should be sufficient for the desired reaction to reach equilibrium. In the majority of instances, this will require a minimum contact time of about 0.5 to about 10.0 seconds, with the lower reaction temperatures necessitating longer contact times. The rapidity with which any of the involved reactions reaches equilibrium depends also on the pressure employed, although I have found, in general, that these reactions are considerably less sensitive to pressure than to temperature. The extent of temperature reduction achieved in the quenching step should, of course, be sufficient to halt substantial conversion of the products in the quenched stream after the desired equilibrium has been attained. Generally speaking, the effluent stream is reduced in temperature by the quenching step to a value of about 300° to about 400° F. in order to realize the beneficial effects of my invention. In the majority of instances in which partial oxidation of hydrocarbons occurs under noncatalytic conditions, the effluent gas it leaves the reactor will vary in temperature from about 600° to about 1,200° or 1,300° F. Accordingly, to take advantage of the principles of my invention, a product gas in the aforesaid temperature range should be reduced after product equilibrium has been attained to a temperature of from about 300° to about 400° F., i. e., a temperature at which very little, if any, further conversion of the products can be expected to occur. Stated otherwise, in order to take advantage of my invention, the temperature of the mixture of hot gaseous products as they issue from the reaction zone should be adjusted to a value within a range from about 425° to about 1,000° F. At temperatures below about 400° F., the reactions involved (see the equations referred to above) occur, if at all, at an extremely slow rate; while, at temperatures in excess of 1,000° F., rather extensive decomposition of the acid, alcohols and aldehydes is observed if the temperature of the mixture remains at this level for an appreciable period of time. Thus, within a temperature range of 425° to 1,000° F., the equilibria involving aldehydes, alcohols and acids in the hot product gases can be changed and the composition of the product gases is altered by decreasing the temperature within the range of 1,000° to 425° F., if it is desired to increase the amount of alcohols and acids present. Increasing the temperature within the aforesaid range results in an increase in aldehyde content of the products.

Within the above-stated temperature range the hydrogen partial pressure may vary from about 0.0001 to about 0.7 atmosphere at a temperature of about 425° F. to a pressure of from about 0.2 up to at least 100 atmospheres at 1,000° F. For example, at a temperature of 425° F., by increasing the hydrogen partial pressure from 0.0001 to 0.7 atmosphere, the aldehyde content of the mixture decreases while the alcohol concentration thereof increases. Similarly, at 1,000° F., going from a hydrogen partial pressure of at least 100 atmospheres down to 0.1 atmosphere, the alcohol content of the mixture will decrease and the aldehyde concentration increases. However, to obtain maximum flexibility in controlling product distribution while maintaining the hydrogen partial pressure within practical limits, partial pressures in the above-recited temperature range of about 0.01 atmosphere to about 1.2 atmospheres are ordinarily preferred. This last-mentioned range of hydrogen partial pressures represents conditions within which aldehyde and alcohol mixtures may be obtained wherein the ratio of aldehyde to alcohol may vary from about 95:5 to 5:95 over the temperature range of 425° to 1,000° F. At higher or lower partial pressures than those covered by the aforesaid pressure range, one or the other of the aldehydes or alcohols, i. e., formaldehyde or acetaldehyde and methanol or ethanol, cannot be secured in ratios of the order stated above. The significance of this fact may be seen from the following explanation. Thus, at 425° F., the lowest possible hydrogen partial pressure at which the methanol content of a methanol-formaldehyde mixture will be in the neighborhood of a 95:5 ratio under the conditions of my invention, is about 0.01 atmosphere. However, to obtain the same concentration of ethanol in an ethanol-acetaldehyde mixture, the hydrogen partial pressure should be at least about 0.7 atmosphere at a temperature of 425° F. By increasing the temperature at either of these two pressures, the aldehyde content of either of the two mixtures may be increased to an aldehyde-alcohol ratio of 95:5 over the temperature range of 425° to 1,000° F. At 1,000° F., the highest hydrogen partial pressure possible at which the acetaldehyde-ethanol ratio of 95:5 can be attained is about 1.2 atmospheres. In the case of the system formaldehyde-methanol, a formaldehyde-methanol ratio of 95:5 can be secured at hydrogen partial pressures of not more than about 0.2 atmosphere. By lowering the temperature from 1,000° F. at either of these two last-mentioned partial pressures, the ratio of either methanol or ethanol to formaldehyde or acetaldehyde, respectively, may range as high as about 95:5.

I again wish to stress that the features of my invention may be applied in connection with conventional methods for the partial oxidation of hydrocarbons wherein either a deficiency or an excess of air or oxygen is employed. My invention, however, resides principally in the discovery that the reactions discussed above reach equilibrium at certain conditions of temperature and pressure and that by alteration of these conditions, followed by immediately quenching the product mixture, the composition of the latter can be changed over a wide range.

It will be appreciated that the principles of my invention can be applied to the partial oxidation of a wide number of hydrocarbon compounds, including gaseous, liquid and solid hydrocarbons. In the case of solid hydrocarbons, the latter may first be melted and then introduced into the reaction zone in the form of a mist; or if a solid hydrocarbon source, such as coal, is employed, it should generally be finely pulverized in order to assure adequate contact with the oxygen in the reaction zone. Also, it is to be pointed out that, with systems in which a catalyst is employed, the temperature of the exit gas, prior to quenching, will generally be substantially lower than 600° to 1,000° F. However, as previously pointed out, the temperature to which the product gas should be lowered for quenching is not fixed but should be sufficient (usually about 400° F.) to inhibit substantially further conversion of the components in the reaction mixture either in the presence or in the absence of a catalyst.

I claim:

1. In a process for increasing the proportion of one of the oxygenated organic compounds selected from the group consisting of formaldehyde, acetaldehyde, acetic acid, methanol and ethanol present in a mixture formed by the vapor phase partial oxidation of hydrocarbons under known conditions, the improvement which comprises adjusting the temperature of hot product gases formed in said partial oxidation step to a value within a range of from about 425° F. at hydrogen partial pressures ranging from about 0.0001 to about 0.7 atmosphere to about 1000° F. at hydrogen partial pressures ranging from about 0.2 to at least 100 atmospheres, subjecting said product gases to the aforesaid conditions of temperature and pressure for a time sufficient to permit equilibrium to be reached with respect to at least one of the following reactions $$CH_3OH \rightleftharpoons CH_2O + H_2$$
$$C_2H_5OH \rightleftharpoons CH_3CHO + H_2$$
$$CH_3COOH \rightleftharpoons 2CO + 2H_2$$

and thereafter rapidly quenching the resulting gaseous products to secure a mixture in which one of said compounds is present in increased ratio to the remaining components of the mixture thus recovered.

2. In a process for increasing the proportion of one of the oxygenated organic compounds selected from the group consisting of formaldehyde, acetaldehyde, acetic acid, methanol and ethanol present in a mixture formed by the vapor phase partial oxidation of hydrocarbons under known conditions, the improvement which comprises adjusting the temperature of the hot product gases formed in said oxidation step to a value within a range of from about 425° to about 1000° F. and at hydrogen partial pressures ranging from about 0.01 to about 1.2 atmospheres, subjecting said product gases to the aforesaid conditions of temperature and pressure for a period of from about 0.5 to about 10.0 seconds in order to permit equilibrium to be reached under said conditions with respect to at least one of the following reactions $$CH_3OH \rightleftharpoons CH_2O + H_2$$
$$C_2H_5OH \rightleftharpoons CH_3CHO + H_2$$
$$CH_3COOH \rightleftharpoons 2CO + 2H_2$$

and thereafter rapidly quenching the resulting gaseous products to secure a mixture in which one of said compounds is present in increased ratio to the remaining components of the mixture thus recovered.

3. In a process for altering the methanol content of a formaldehyde containing mixture formed by the vapor phase partial oxidation of hydrocarbons, the improvement which comprises adjusting the temperature of the hot product gases produced in said partial oxidation step to a value of from about 425° F. at a hydrogen partial pressure of about 0.01 atmosphere to about 1000° F. at a hydrogen partial pressure of about 0.2 atmosphere, subjecting said product gases to the aforesaid conditions of temperature and pressure for a period of from about 0.5 to about 10.0 seconds in order to permit equilibrium to be reached under said conditions, and thereafter rapidly quenching the resulting gaseous mixture whereby the weight ratio of methanol to formaldehyde in the mixture thus obtained varies from about 95:5 to about 5:95.

4. In a process for altering the ethanol content of an acetaldehyde containing mixture formed by the vapor phase partial oxidation of hydrocarbons, the improvement which comprises adjusting the temperature of the hot product gases produced in said partial oxidation step to a value of from about 425° F. at a hydrogen partial pressure of about 0.7 atmosphere to about 1000° F. at a hydrogen partial pressure of about 1.2 atmosphere, subjecting said product gases to the aforesaid conditions of temperature and pressure for a period of from about 0.5 to about 10.0 seconds in order to permit equilibrium to be reached under said conditions and thereafter rapidly quenching the resulting gaseous mixture whereby the weight ratio of ethanol to acetaldehyde in the mixture thus obtained varies from about 95:5 to about 5:95.

5. In a process for altering the methanol and acetic acid content of a formaldehyde-containing mixture formed by the vapor phase partial oxidation of hydrocarbons, the improvement which comprises adjusting the temperature of the hot product gases produced in said partial oxidation step to a value of from about 425° F. at a hydrogen partial pressure of about 0.01 atmosphere to about 1000° F. at a hydrogen partial pressure of about 0.02 atmosphere, subjecting said product gases to the aforesaid conditions of temperature and pressure for a period of from about 0.5 to about 10.0 seconds in order to permit equilibrium to be reached under said conditions with respect to at least one of the following reactions $$CH_3OH \rightleftharpoons HCHO + H_2$$
$$CH_3COOH \rightleftharpoons 2CO + 2H_2$$

and thereafter rapidly quenching the resulting gaseous mixture, whereby the weight ratio of methanol to formaldehyde in the mixture thus obtained varies from about 95:5 to about 5:95.

6. In a process for altering the ethanol and acetic acid content of an acetaldehyde-containing mixture formed by the vapor phase partial oxidation of hydrocarbons, the improvement which comprises adjusting the temperature of the hot product gases produced in said partial oxidation step to a value of from about 425° F. at a hydrogen partial pressure of about 0.7 atmosphere to about 1000° F. at a hydrogen partial pressure of about 1.2 atmospheres, subjecting said product gases to the aforesaid conditions of temperature and pressure for a period of from about 0.5 to about 10.0 seconds in order to permit equilibrium to be reached under said conditions with respect to at least one of the following reactions $$C_2H_5OH \rightleftharpoons CH_3CHO + H_2$$
$$CH_3COOH \rightleftharpoons 2CO + 2H_2$$

and thereafter rapidly quenching the resulting gaseous mixture, whereby the weight ratio of ethanol to acetaldehyde in the mixture thus obtained varies from about 95:5 to about 5:95.

7. In a process for increasing the proportion of one of the oxygenated organic compounds selected from the group consisting of formaldehyde, acetaldehyde, acetic acid, methanol and ethanol present in a mixture formed by the vapor phase partial oxidation of hydrocarbons under known conditions, the improvement which comprises withdrawing said mixture from a vapor phase partial oxidation reaction zone, thereafter regulating the temperature of the hot product gases formed in said partial oxidation step to a value within a range of from about 425° to about 1,000° F., with the temperature in said range being adjusted down to a minimum of about 425° F. at hydrogen partial pressures ranging from about 0.0001 to about .07 atmosphere and the temperature being adjusted within said range up to a maximum of about 1,000 F. at hydrogen partial pressures ranging from about 0.2 to at least 100 atmospheres, subjecting said product gas to the aforesaid temperature conditions for a time sufficient to permit equilibrium to be reached with respect to at least one of the following reactions $$CH_3OH \rightleftharpoons CH_2O + H_2$$
$$C_2H_5OH \rightleftharpoons CH_3CHO + H_2$$
$$CH_3COOH \rightleftharpoons 2CO + 2H_2$$

and thereafter rapidly quenching the resulting gaseous product to secure a mixture in which one of said compounds is present in increased ratio with respect to the concentration thereof in the original mixture.

References Cited in the file of this patent

UNITED STATES PATENTS

| 1,911,746 | Burke et al. | May 30, 1933 |
| 2,007,115 | Walker | July 2, 1935 |
| 2,007,116 | Walker | July 2, 1935 |
| 2,042,134 | Walker | May 26, 1936 |